(12) United States Patent
Ito

(10) Patent No.: US 8,939,243 B2
(45) Date of Patent: Jan. 27, 2015

(54) BUMPER MODULE

(75) Inventor: Keita Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/643,739

(22) PCT Filed: Dec. 21, 2010

(86) PCT No.: PCT/JP2010/073035
§ 371 (c)(1),
(2), (4) Date: Oct. 26, 2012

(87) PCT Pub. No.: WO2012/086014
PCT Pub. Date: Jun. 28, 2012

(65) Prior Publication Data
US 2013/0285397 A1    Oct. 31, 2013

(51) Int. Cl.
  *B60K 11/00* (2006.01)
  *B60R 19/02* (2006.01)
  *B60R 19/18* (2006.01)
  *B60K 11/04* (2006.01)
  *B60K 11/08* (2006.01)
  *B60R 19/48* (2006.01)

(52) U.S. Cl.
  CPC .............. *B60R 19/023* (2013.01); *B60R 19/18* (2013.01); *B60K 11/04* (2013.01); *B60K 11/08* (2013.01); *B60R 19/48* (2013.01); *B60R 2019/1893* (2013.01)
  USPC .................................... 180/68.1; 296/193.09

(58) Field of Classification Search
  CPC ...... B60R 19/52; B60R 19/023; B60R 19/18; B60R 19/48; B60R 2019/1893; B60K 11/04; B60K 11/08

USPC ............ 180/68.1, 68.2, 68.4, 68.6, 232, 274; 296/193.1, 193.09
See application file for complete search history.

(56) References Cited

U.S. PATENT DOCUMENTS

| | | | | |
|---|---|---|---|---|
| 4,020,900 | A | * | 5/1977 | Kitagawa ...................... 165/135 |
| 4,116,269 | A | * | 9/1978 | Ikeda ............................ 165/126 |
| 4,169,501 | A | * | 10/1979 | Takeuchi et al. ............. 165/126 |

(Continued)

FOREIGN PATENT DOCUMENTS

| CN | 101209700 A | 7/2008 |
|---|---|---|
| EP | 1 944 205 A1 | 7/2008 |

(Continued)

*Primary Examiner* — Hau Phan
*Assistant Examiner* — Jacob Meyer
(74) *Attorney, Agent, or Firm* — Oliff PLC

(57) ABSTRACT

A bumper module including a body portion that is positioned between a front bumper cover and a heat exchanger in a vehicle front-and-rear direction and is disposed extending in a vehicle width direction and the vehicle front-and-rear direction; plural longitudinal ribs that are integrally formed on a lower surface of the body portion, extend toward a vehicle lower side, are disposed extending in the vehicle front-and-rear direction, and are lined up at intervals apart from each other in the vehicle width direction; and an air guide rib that is integrally formed on an upper surface of the body portion, extends toward a vehicle upper side, guides cooling air from a vehicle front to the heat exchanger, and whose front end is unaligned in at least one direction of the vehicle width direction and the vehicle front-and-rear direction with respect to front ends of the plural longitudinal ribs.

4 Claims, 10 Drawing Sheets

(56) References Cited

U.S. PATENT DOCUMENTS

| | | | |
|---|---|---|---|
| 4,424,996 A * | 1/1984 | Yoshiyuki | 293/117 |
| 5,588,482 A * | 12/1996 | Holka | 165/44 |
| 5,715,904 A * | 2/1998 | Takahashi et al. | 180/229 |
| 5,984,035 A * | 11/1999 | Katoh et al. | 180/68.1 |
| 6,019,161 A * | 2/2000 | Travis | 165/41 |
| 6,168,226 B1 * | 1/2001 | Wycech | 296/146.6 |
| 6,405,819 B1 * | 6/2002 | Ohkura et al. | 180/68.1 |
| 6,540,275 B1 * | 4/2003 | Iwamoto et al. | 293/24 |
| 6,543,525 B2 * | 4/2003 | Kalbacher | 165/140 |
| 6,622,808 B2 * | 9/2003 | Sasano et al. | 180/68.3 |
| 6,626,483 B2 * | 9/2003 | Ozawa et al. | 296/193.09 |
| 6,659,220 B2 * | 12/2003 | Kobayashi | 180/68.6 |
| 6,688,424 B1 * | 2/2004 | Nakada et al. | 181/224 |
| 6,712,410 B2 * | 3/2004 | Kudelko et al. | 293/102 |
| 6,921,117 B2 * | 7/2005 | Rackham et al. | 293/115 |
| 6,945,593 B2 * | 9/2005 | Andre et al. | 296/187.09 |
| 7,114,587 B2 * | 10/2006 | Mori et al. | 180/68.3 |
| 7,325,861 B2 * | 2/2008 | Zacheiss et al. | 296/187.09 |
| 7,331,413 B2 * | 2/2008 | Okai et al. | 180/68.4 |
| 7,410,018 B2 * | 8/2008 | Satou | 180/68.4 |
| 7,441,828 B2 * | 10/2008 | Noyori et al. | 296/187.04 |
| 7,481,484 B2 * | 1/2009 | Hirano | 296/187.04 |
| 7,517,006 B2 * | 4/2009 | Kageyama et al. | 296/187.09 |
| 7,520,561 B2 * | 4/2009 | Nakamae et al. | 296/193.09 |
| 7,597,383 B2 * | 10/2009 | Itou et al. | 296/187.04 |
| 7,607,720 B2 * | 10/2009 | Noyori et al. | 296/187.04 |
| 7,699,383 B2 * | 4/2010 | Fukukawa et al. | 296/187.04 |
| 7,726,428 B2 * | 6/2010 | Kowalski | 180/68.6 |
| 7,766,112 B2 * | 8/2010 | Kapadia et al. | 180/68.4 |
| 7,887,121 B2 * | 2/2011 | Hasegawa et al. | 296/187.04 |
| 7,887,125 B2 * | 2/2011 | Tazaki et al. | 296/193.1 |
| 7,900,964 B2 * | 3/2011 | Chretien et al. | 280/784 |
| 8,042,847 B2 * | 10/2011 | Garg et al. | 293/102 |
| 8,104,805 B2 * | 1/2012 | Suzuki et al. | 293/132 |
| 8,312,949 B2 * | 11/2012 | Hirukawa et al. | 180/68.1 |
| 8,449,021 B2 * | 5/2013 | Mana et al. | 296/187.04 |
| 8,561,741 B2 * | 10/2013 | Kurokawa et al. | 180/68.4 |
| 8,613,338 B2 * | 12/2013 | Rasset et al. | 180/68.4 |
| 8,646,554 B2 * | 2/2014 | Takahashi et al. | 180/68.4 |
| 2001/0054497 A1 * | 12/2001 | Kalbacher | 165/140 |
| 2002/0070062 A1 * | 6/2002 | Joutaki et al. | 180/68.4 |
| 2002/0084122 A1 * | 7/2002 | Emori et al. | 180/68.4 |
| 2002/0096378 A1 * | 7/2002 | Kobayashi | 180/68.6 |
| 2003/0192727 A1 * | 10/2003 | Mori et al. | 180/68.4 |
| 2004/0084236 A1 * | 5/2004 | Okai et al. | 180/68.4 |
| 2006/0081354 A1 * | 4/2006 | Miura et al. | 165/41 |
| 2007/0046043 A1 * | 3/2007 | Ito | 293/120 |
| 2007/0080009 A1 * | 4/2007 | Kowalski | 180/68.6 |
| 2007/0085356 A1 * | 4/2007 | Itou et al. | 293/120 |
| 2007/0138815 A1 * | 6/2007 | Fukukawa et al. | 293/15 |
| 2007/0182171 A1 * | 8/2007 | Kageyama et al. | 293/102 |
| 2007/0284915 A1 * | 12/2007 | Hasegawa et al. | 296/187.04 |
| 2008/0001433 A1 * | 1/2008 | Noyori et al. | 296/187.04 |
| 2008/0157566 A1 * | 7/2008 | Tazaki et al. | 296/193.1 |
| 2008/0169661 A1 * | 7/2008 | Hirano | 293/15 |
| 2008/0217959 A1 * | 9/2008 | Noyori et al. | 296/187.04 |
| 2008/0246289 A1 * | 10/2008 | Skinner et al. | 293/115 |
| 2008/0258485 A1 * | 10/2008 | Fukukawa et al. | 296/1.04 |
| 2008/0308333 A1 * | 12/2008 | Kapadia et al. | 180/68.4 |
| 2012/0080255 A1 * | 4/2012 | Elhardt et al. | 180/68.6 |
| 2012/0261205 A1 * | 10/2012 | Iania | 180/274 |
| 2013/0015011 A1 * | 1/2013 | Hasegawa et al. | 180/274 |

FOREIGN PATENT DOCUMENTS

| | | |
|---|---|---|
| JP | A-2003-306047 | 10/2003 |
| JP | A-2009-227037 | 10/2009 |

* cited by examiner

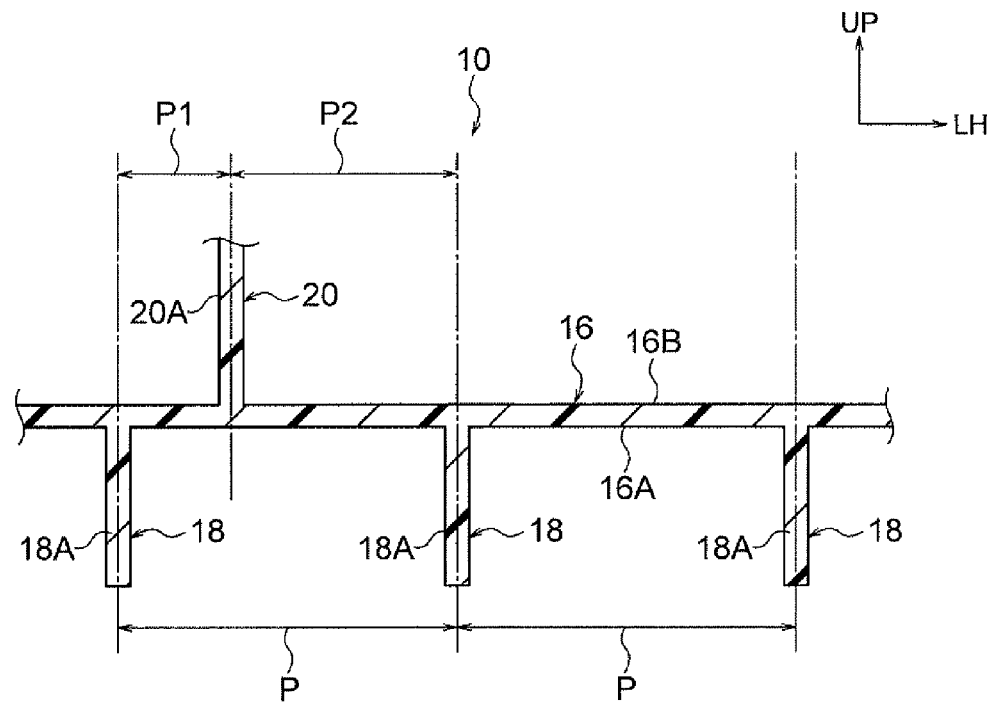
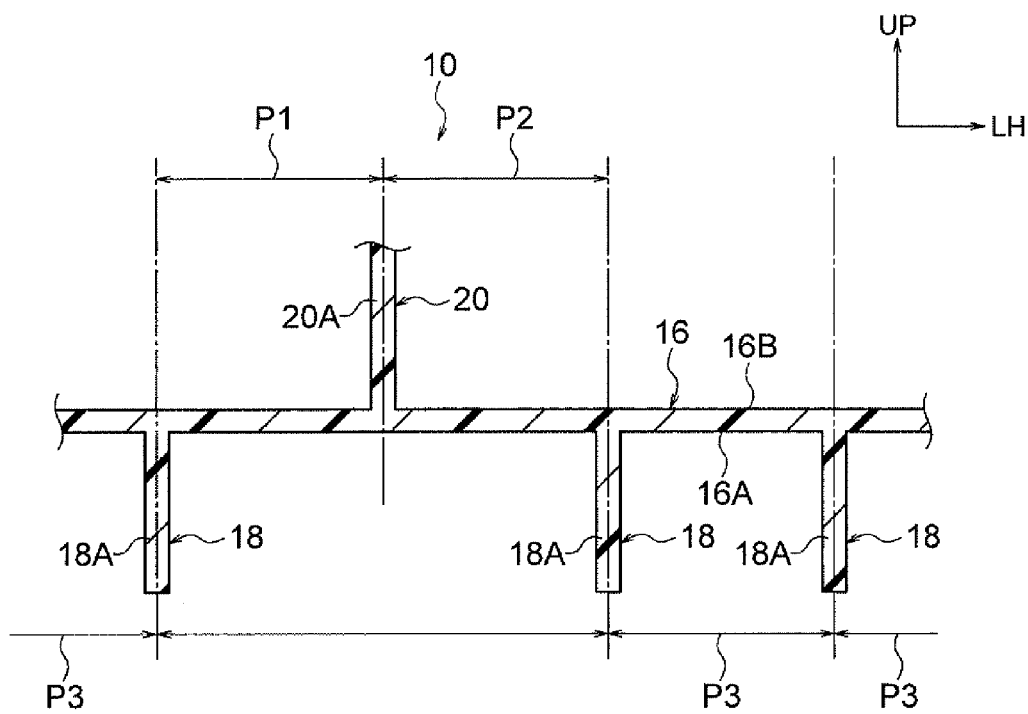

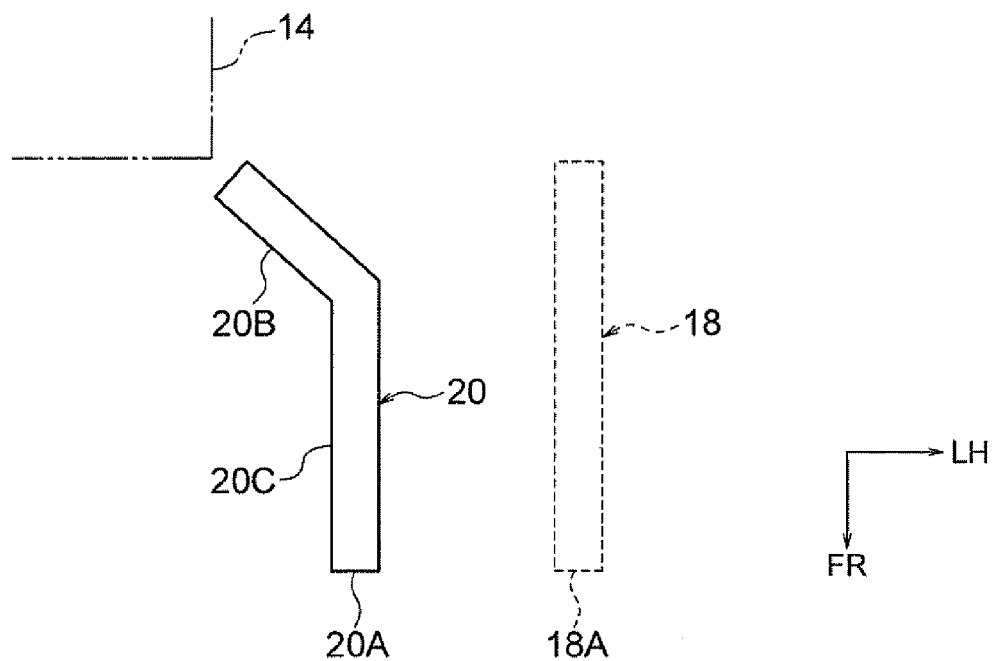
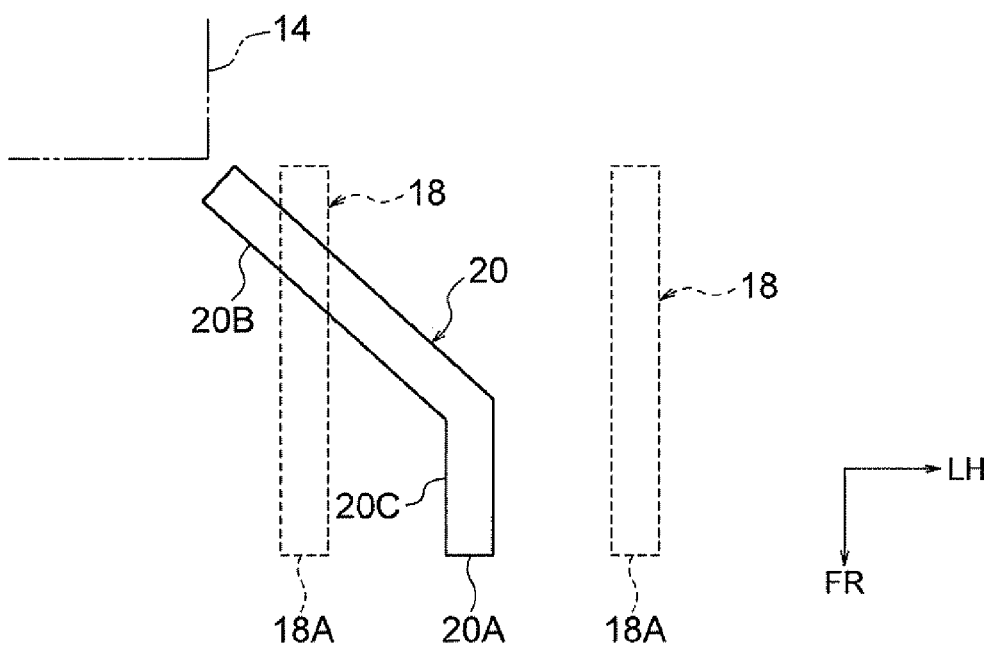

BUMPER MODULE

TECHNICAL FIELD

The present invention relates to a bumper module.

BACKGROUND ART

Conventionally, there has been known a vehicle body front portion structure of an automobile in which an air duct portion that guides cooling air from a vehicle front side to a radiator installed on a radiator core support is formed by an upper side cover member, a lower side cover member, and air guide plates on both left and right sides (e.g., see patent document 1). In this structure, plural longitudinal rib walls are integrally formed at intervals in the vehicle width direction on the lower side cover member in order to ensure rigidity.

PRIOR ART DOCUMENTS

Patent Documents

Patent Document 1: JP-A No. 2003-306047

SUMMARY OF INVENTION

Technical Problem

However, in the above-described structure, the air guide plates are configured as separate bodies apart from the lower side cover member. Consequently, the number of parts increases, which leads to an increase in costs.

Here, it is also conceivable to mold the air guide plates integrally with the lower side cover member in order to suppress an increase in the number of parts. However, in this case, the air guide plates come to have a lower absorber function in addition to a duct function. That is, in a case where an impact load caused by an impactor acts from the vehicle front side on the lower side cover member that functions as a lower absorber, the air guide plates come to generate a reaction force with respect to this impact load.

However, in order to more effectively absorb the impact load of an impactor, it is preferred that the reaction force on the impactor not become locally larger in the sites in the lower side cover member where the air guide plates are positioned—or in other words, that variations in the reaction force on the impactor obtained in each site of a body portion be small.

The present invention has been made in view of the above-described problem, and it is an object thereof to provide a bumper module which, even when an air guide rib is integrally formed on a body portion, can suppress variations in the reaction force on the impactor obtained in each site of the body portion.

Solution to Problem

In order to solve the above-described problem, a bumper module pertaining to a first aspect of the present invention includes: a body portion that is positioned between a front bumper cover and a heat exchanger in a vehicle front-and-rear direction and is disposed extending in a vehicle width direction and the vehicle front-and-rear direction; plural longitudinal ribs that are integrally formed on a lower surface of the body portion, extend toward a vehicle lower side, are disposed extending in the vehicle front-and-rear direction, and are lined up at intervals apart from each other in the vehicle width direction; and an air guide rib that is integrally formed on an upper surface of the body portion, extends toward a vehicle upper side, guides cooling air from a vehicle front to the heat exchanger, and whose front end is unaligned in at least one direction of the vehicle width direction and the vehicle front-and-rear direction with respect to front ends of the plural longitudinal ribs.

According to this bumper module, the air guide rib is integrally formed on the upper surface of the body portion. Consequently, compared to a case where the air guide rib is configured as a separate body apart from the body portion, an increase in the number of parts can be suppressed, so costs can be reduced.

Further, the front end of the air guide rib is unaligned in at least one direction of the vehicle width direction and the vehicle front-and-rear direction with respect to the front ends of the plural longitudinal ribs. Consequently, for example, compared to a case where the position of the front end of the air guide rib coincides in the vehicle width direction and the vehicle front-and-rear direction with the position of the front end of any longitudinal rib of the plural longitudinal ribs, the rigidity of the site in the body portion where the front end of the air guide rib is positioned can be suppressed. Because of this, even in a case where an impact load caused by an impactor acts from the vehicle front side on the body portion, the reaction force on the impactor can be suppressed from becoming locally higher in the site in the body portion where the front end of the air guide rib is positioned. As a result, variations in the reaction force on the impactor obtained in each site of the body portion can be suppressed.

A bumper module pertaining to a second aspect of the present invention is given a configuration where, in the bumper module pertaining to the first aspect of the present invention, front ends of plural ribs including the plural longitudinal ribs and the air guide rib are lined up at equal pitches in the vehicle width direction.

According to this bumper module, compared to a case where front ends of plural ribs including the plural longitudinal ribs and the air guide rib are lined up at unequal pitches in the vehicle width direction, variations in rigidity in each site of the body portion can be suppressed. Because of this, variations in the reaction force on the impactor obtained in each site of the body portion can be suppressed even more.

A bumper module pertaining to a third aspect of the present invention is given a configuration where, in the bumper module pertaining to the first aspect or the second aspect of the present invention, the air guide rib has an inclined portion that heads outward in the vehicle width direction as it heads toward the vehicle front side and a front portion that is formed on the vehicle front side of the inclined portion.

According to this bumper module, even in a case where the angle of inclination and the length of the inclined portion have been set in such a way the air guide rib can smoothly guide the cooling air from the vehicle front to the heat exchanger, simply by changing the extension direction and the length of the front portion, the front end of the air guide rib can be shifted in at least one direction of the vehicle width direction and the vehicle front-and-rear direction with respect to the front ends of each of the longitudinal ribs.

A bumper module pertaining to a fourth aspect of the present invention is given a configuration where, in the bumper module pertaining to the third aspect of the present invention, the front portion is disposed extending in the vehicle front-and-rear direction and is positioned in a center portion between any pair of longitudinal ribs of the plural longitudinal ribs adjacent to each other in the vehicle width direction as seen in a plan view.

According to this bumper module, rigidity can be equalized between the one side and the other side of the pair of the longitudinal ribs positioned on both sides of the front portion in the vehicle width direction, and therefore the reaction force on the impactor can be equalized.

A bumper module pertaining to a fifth aspect of the present invention is given a configuration where, in the bumper module pertaining to any one of the first aspect to the third aspect of the present invention, the front ends of the plural longitudinal ribs are positioned on a vehicle rear side of a front end of the body portion.

According to this bumper module, a buffer area is ensured between each of the longitudinal ribs and the front bumper cover, so the impact absorption of the bumper module can be raised.

A bumper module pertaining to a sixth aspect of the present invention is given a configuration where, in the bumper module pertaining to the fifth aspect of the present invention, the air guide rib has a front portion that is positioned on the vehicle front side of the front ends of the plural longitudinal ribs as seen in a plan view and extends toward the front end of the body portion.

According to this bumper module, the gap between the front end of the air guide rib and the front bumper cover can be narrowed. Consequently, the cooling air flowing from the vehicle front through open portions formed in the front bumper cover can be suppressed from leaking from between the air guide rib and the front bumper cover. Because of this, aerodynamic performance can be improved and the cooling air can be smoothly guided to the heat exchanger.

Advantageous Effects of Invention

As described in detail above, according to the bumper module of the present invention, even when an air guide rib is integrally formed on a body portion, variations in the reaction force on an impactor obtained in each site of the body portion can be suppressed.

BRIEF DESCRIPTION OF DRAWINGS

FIG. 3 is a front view of main portions of the bumper module shown in FIG. 2;

FIG. 4 is a main portion enlarged front view in a state where the front side wall portion has been removed and shows a first modification of the bumper module shown in FIG. 1;

FIG. 7 is a main portion enlarged plan view showing a fourth modification of the bumper module shown in FIG. 1;

FIG. 8 is a main portion enlarged plan view showing a fifth modification of the bumper module shown in FIG. 1;

DESCRIPTION OF EMBODIMENT

Figure 1:
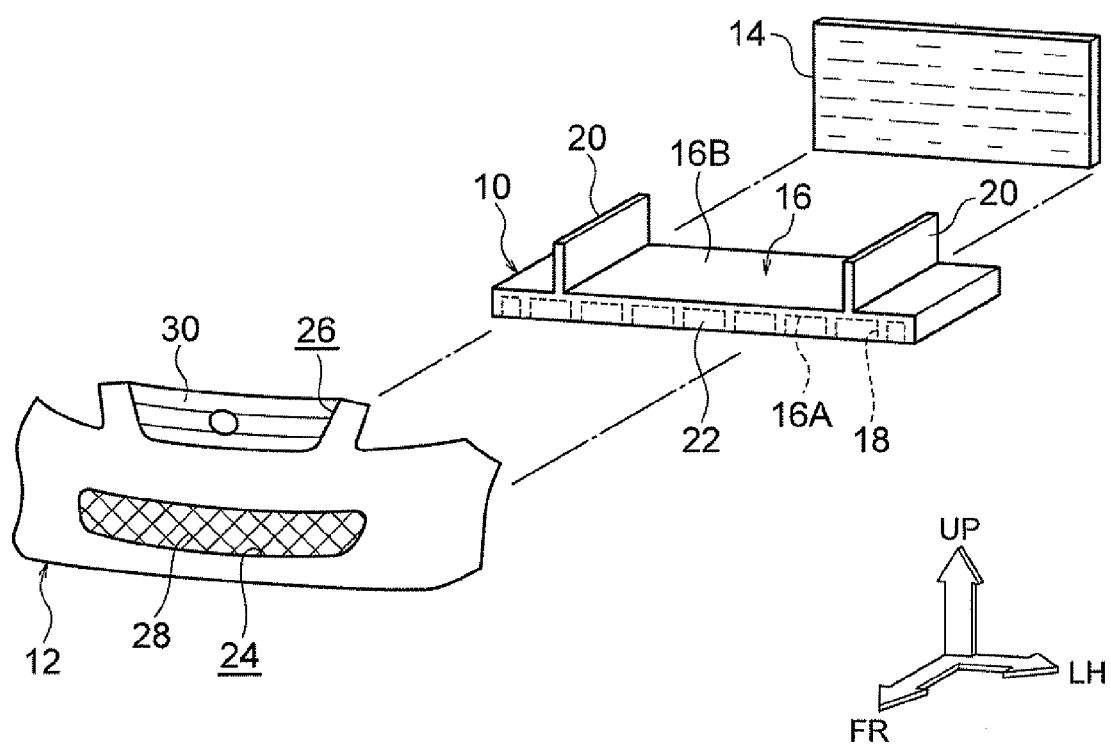
FIG. 1 is an exploded perspective view of a bumper module pertaining to an embodiment of the present invention, a front bumper cover, and a heat exchanger.

An embodiment of the present invention will be described below with reference to the drawings.

Arrow UP, arrow FR, and arrow LH shown in the drawings indicate upward in a vehicle up-and-down direction, frontward in a vehicle front-and-rear direction, and leftward in a vehicle width direction, respectively.

As shown in FIG. 1, a bumper module 10 pertaining to the embodiment of the present invention is placed between a front bumper cover 12 and a heat exchanger 14 in the vehicle front-and-rear direction and is fixed to at least one of the front bumper cover 12 and a vehicle body. The bumper module 10 is formed entirely out of resin and is equipped with a body portion 16, plural longitudinal ribs 18, and a pair of air guide ribs 20.

The body portion 16 is disposed extending in the vehicle width direction and the vehicle front-and-rear direction and is formed in a substantially quadrilateral plate shape as seen in a plan view. A front side wall portion 22 that extends toward the vehicle lower side is integrally formed on a front end of the body portion 16. The front side wall portion 22 is disposed extending in the vehicle width direction and interconnects front ends of the plural longitudinal ribs 18 described later.

The plural longitudinal ribs 18 are integrally formed on a lower surface 16A of the body portion 16. The plural longitudinal ribs 18 extend toward the vehicle lower side and are disposed extending in the vehicle front-and-rear direction. Further, the plural longitudinal ribs 18 are lined up at intervals apart from each other in the vehicle width direction from the end portion on one side of the body portion 16 in the vehicle width direction to the end portion on the other side. In FIG. 1, in order to facilitate understanding, the mutual intervals between the plural longitudinal ribs 18 and the widths (thicknesses) of the longitudinal ribs 18 and the air guide ribs 20 described later are exaggeratedly shown.

The pair of air guide ribs 20 are integrally formed on an upper surface 16B of the body portion 16. The pair of air guide ribs 20 extend toward a vehicle upper side and are disposed extending in the vehicle front-and-rear direction. Further, the pair of air guide ribs 20 are positioned on both sides of the heat exchanger 14 in the vehicle width direction and are given a configuration where they guide, to the heat exchanger 14, cooling air from the vehicle front introduced from a lower side open portion 24 and an upper side open portion 26 formed in the front bumper cover 12.

The lower side open portion 24 is formed in a size that fits between the pair of air guide ribs 20 as seen in a front view. A lower grill 28 is disposed in the lower side open portion 24. Further, an upper grill 30 is disposed in the upper side open portion 26. The lower grill 28 and the upper grill 30 may be formed integrally with the bumper module 10.

Figure 2:
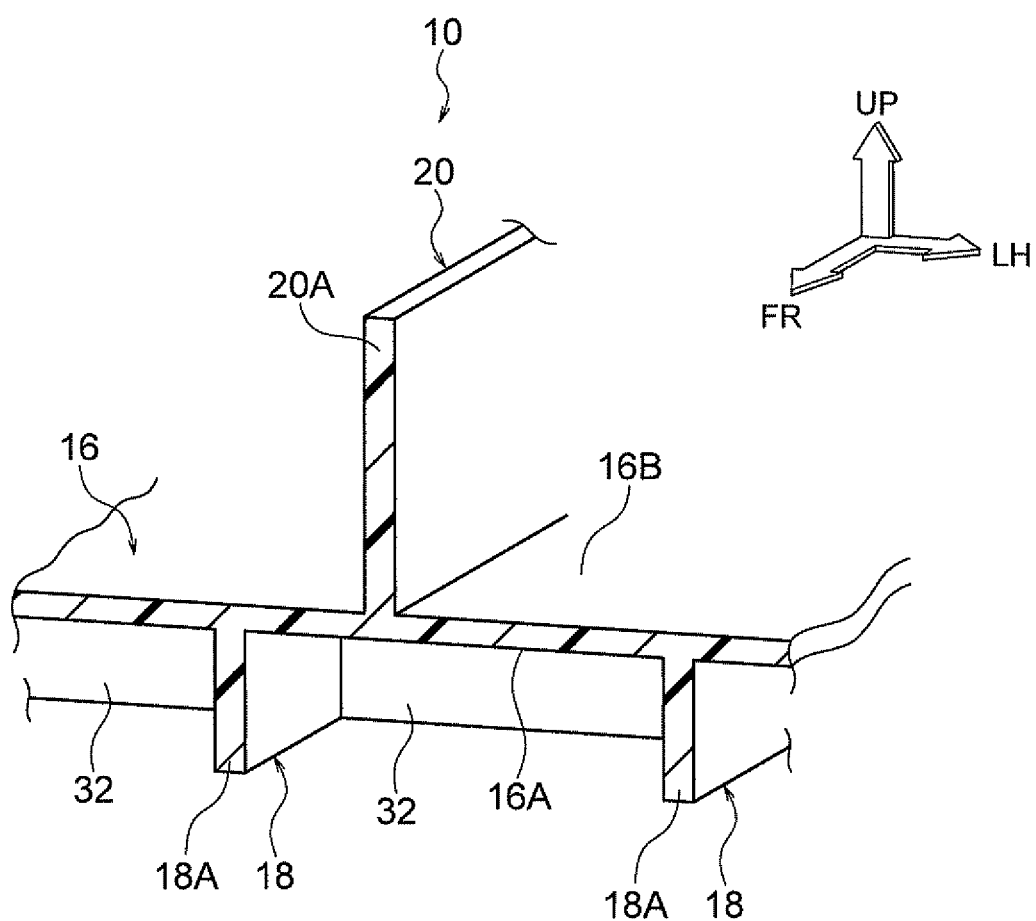
FIG. 2 is a main portion enlarged perspective view in a state where a front side wall portion in the bumper module shown in FIG. 1 has been removed.

Further, as shown in FIG. 2, transverse ribs 32 that extend in the vehicle width direction are formed in the bumper module 10. Additionally, pairs of longitudinal ribs 18 of the plural longitudinal ribs 18 adjacent to each other in the vehicle width direction are interconnected by the transverse ribs 32.

Further, as shown in FIG. 3, each of the air guide ribs 20 is unaligned in the vehicle width direction with respect to the plural longitudinal ribs 18. That is, in other words, each of the air guide ribs 20 is positioned between any pair of longitudinal ribs 18 of the plural longitudinal ribs 18 adjacent to each other in the vehicle width direction. Additionally, a pitch P1 between one of the pair of the longitudinal ribs 18 and the air guide rib 20 and a pitch P2 between the other of the pair of the longitudinal ribs 18 and the air guide rib 20 are set so as to be different. Further, the plural longitudinal ribs 18 are lined up at equal pitches P.

Here, one of the pair of the air guide ribs 20 shown in FIG. 1 is described, but the bumper module 10 is formed in a plane-symmetrical shape centered on the center portion in the vehicle width direction. Consequently, the other of the pair of the air guide ribs 20 is given the same configuration as that of the one of the pair of the air guide ribs 20, so description thereof will be omitted.

Further, the heat exchanger 14 is for cooling engine cooling water, but in addition to this, it may also be, for example, a cooler condenser for an air conditioning apparatus in an electric vehicle.

Next, the effects of the embodiment of the present invention will be described.

First, in order to clarify the effects of the embodiment of the present invention, comparative examples will be described. In each of the comparative examples, in order to facilitate comparison, reference signs that are the same as those in the embodiment will be used.

Figure 14:
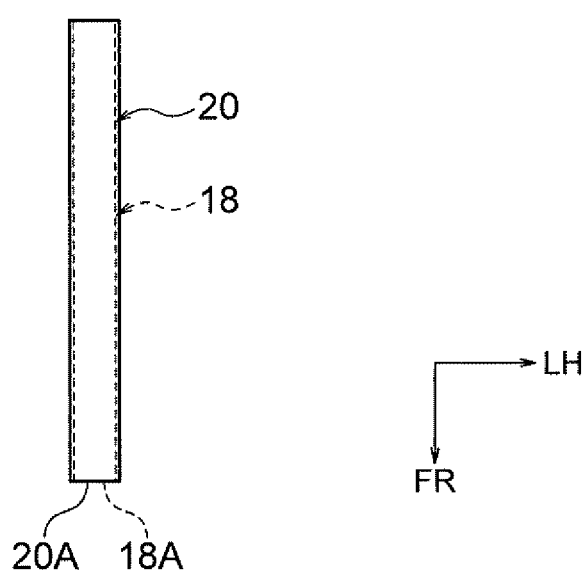
FIG. 14 is a main portion enlarged plan view of a bumper module pertaining to a first comparative example.

In a first comparative example shown in FIG. 14, the air guide rib 20 coincides, as seen in a plan view, with any of the longitudinal ribs 18. The position of a front end 20A of the air guide rib 20 coincides in the vehicle width direction and the vehicle front-and-rear direction with the position of a front end 18A of any of the longitudinal ribs 18.

Figure 15:
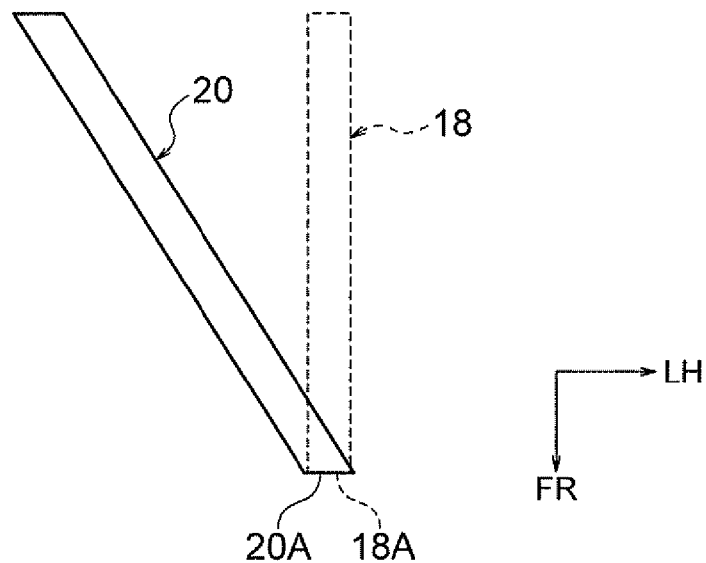
FIG. 15 is a main portion enlarged plan view of a bumper module pertaining to a second comparative example.

Further, in a second comparative example shown in FIG. 15, the air guide rib 20 is inclined with respect to the vehicle front-and-rear direction in such a way that it heads toward the vehicle outer side as it heads toward the vehicle front side. However, the position of the front end 20A of the air guide rib 20 coincides in the vehicle width direction and the vehicle front-and-rear direction with the position of the front end 18A of any of the longitudinal ribs 18.

Figure 16:
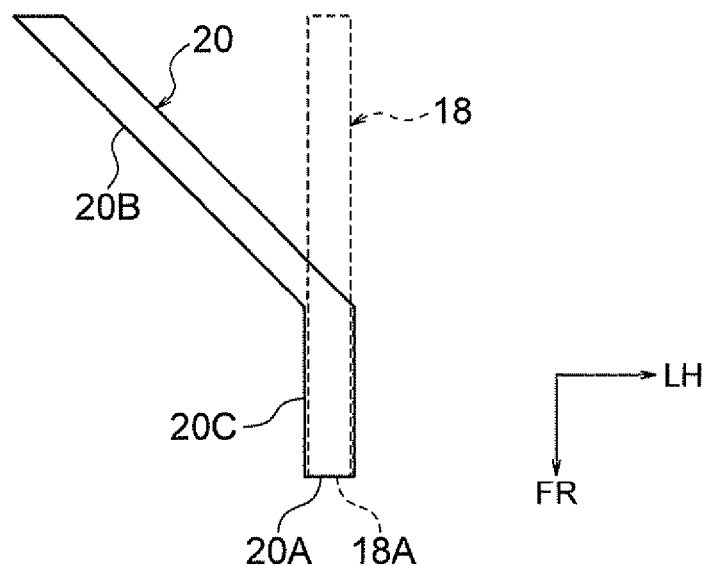
FIG. 16 is a main portion enlarged plan view of a bumper module pertaining to a third comparative example.

Moreover, in a third comparative example shown in FIG. 16, the air guide rib 20 has an inclined portion 20B that is inclined with respect to the vehicle front-and-rear direction in such a way that it heads toward the vehicle outer side as it heads toward the vehicle front side and a front portion 20C that is formed on the vehicle front side of the inclined portion 20B and extends in the vehicle front-and-rear direction. However, the position of the front end 20A of the air guide rib 20 coincides in the vehicle width direction and the vehicle front-and-rear direction with the position of the front end 18A of any of the longitudinal ribs 18.

However, if the position of the front end 20A of the air guide rib 20 coincides in the vehicle width direction and the vehicle front-and-rear direction with the position of the front end 18A of any of the longitudinal ribs 18 like in the above comparative examples, there are the following problems. That is, in a case where an impact load caused by an impactor acts from the vehicle front side on the body portion 16 that functions as a lower absorber, there is the concern that the reaction force on the impactor will become locally higher in the sites in the body portion 16 where the front ends 20A of the air guide ribs 20 are positioned. Additionally, in this case, there is the concern that variations will arise in the reaction force on the impactor obtained in each site of the body portion 16.

In contrast, as shown in FIG. 3, according to the bumper module 10 pertaining to the embodiment of the present invention, the entire air guide rib 20 including the front end 20A is unaligned in the vehicle width direction with respect to the plural longitudinal ribs 18. Consequently, compared to a case where the position of the front end 20A of the air guide rib 20 coincides in the vehicle width direction and the vehicle front-and-rear direction with the position of the front end 18A of any of the longitudinal ribs 20 like in the first to third comparative examples, the rigidity of the site in the body portion 16 where the air guide rib 20 is positioned can be suppressed. Because of this, even in a case where an impact load caused by an impactor acts from the vehicle front side on the body portion 16, the reaction force on the impactor can be suppressed from becoming locally higher in the site in the body portion 16 where the air guide rib 20 is positioned. As a result, variations in the reaction force on the impactor obtained in each site of the body portion 16 can be suppressed.

Further, the air guide rib 20 is integrally formed on the upper surface 16B of the body portion 16. Consequently, compared to a case where the air guide rib 20 is configured as a separate body apart from the body portion 16, an increase in the number of parts can be suppressed, so costs can be reduced.

Next, modifications of the embodiment of the present invention will be described.

As shown in FIG. 4, plural ribs including the plural longitudinal ribs 18 and the air guide rib 20 may be lined up at equal pitches in the vehicle width direction. That is, in this modification, the air guide rib 20 is positioned in a center portion of any pair of longitudinal ribs 18 of the plural longitudinal ribs 18 adjacent to each other in the vehicle width direction. Additionally, the pitch P1 between one of the pair of the longitudinal ribs 18 and the air guide rib 20 and the pitch P2 between the other of the pair of the longitudinal ribs 18 and the air guide rib 20 are set so as to be identical. Further, pitches P3 between pairs of longitudinal ribs 18 of the plural longitudinal ribs 18 unaligned in the vehicle width direction with respect to the air guide rib 20 and adjacent to each other in the vehicle width direction are set so as to be identical.

According to this modification, compared to a case where plural ribs including the plural longitudinal ribs 18 and the air guide rib 20 are lined up at unequal pitches in the vehicle width direction, variations in rigidity in each site of the body portion 16 can be suppressed. Because of this, variations in the reaction force on the impactor obtained in each site of the body portion 16 can be suppressed even more.

The plural ribs including the plural longitudinal ribs 18 and the air guide rib 20 may include ribs other than the plural longitudinal ribs 18 and the air guide rib 20, such as, for example, a rectifying rib that is formed on the upper surface 16B of the body portion 16 and rectifies the cooling air from the vehicle front side and a reinforcing rib that is formed on the upper surface 16B of the body portion 16 and reinforces the body portion 16.

Further, in the embodiment of the present invention shown in FIG. 1 to FIG. 3 and in the modification shown in FIG. 4, the entire air guide rib 20 including the front end 20A is unaligned in the vehicle width direction with respect to each of the longitudinal ribs 18. However, in order to suppress variations in the reaction force on the impactor obtained in each site of the body portion 16, it suffices for at least the front end 20A of the air guide rib 20 to be unaligned in at least one direction of the vehicle width direction and the vehicle frontand-rear direction with respect to the front ends 18A of the plural longitudinal ribs 18. Further, the portions of the plural longitudinal ribs 18 and the air guide rib 20 on the vehicle rear side of the front ends 18A and 20A may be in any mutual positional relationship.

Modifications where the front end 20A of the air guide rib 20 is unaligned in at least one direction of the vehicle width direction and the vehicle front-and-rear direction with respect to the front ends 18A of the plural longitudinal ribs 18 will be described below. In the following modifications shown in FIG. 5 to FIG. 13, in order to facilitate understanding, the lengths of the air guide rib 20 and the longitudinal ribs 18 in the vehicle front-and-rear direction are shown in a shortened state, and angles of inclination of the air guide rib 20 or an inclined portion formed on the air guide rib are shown in an exaggerated state.

Figure 5:
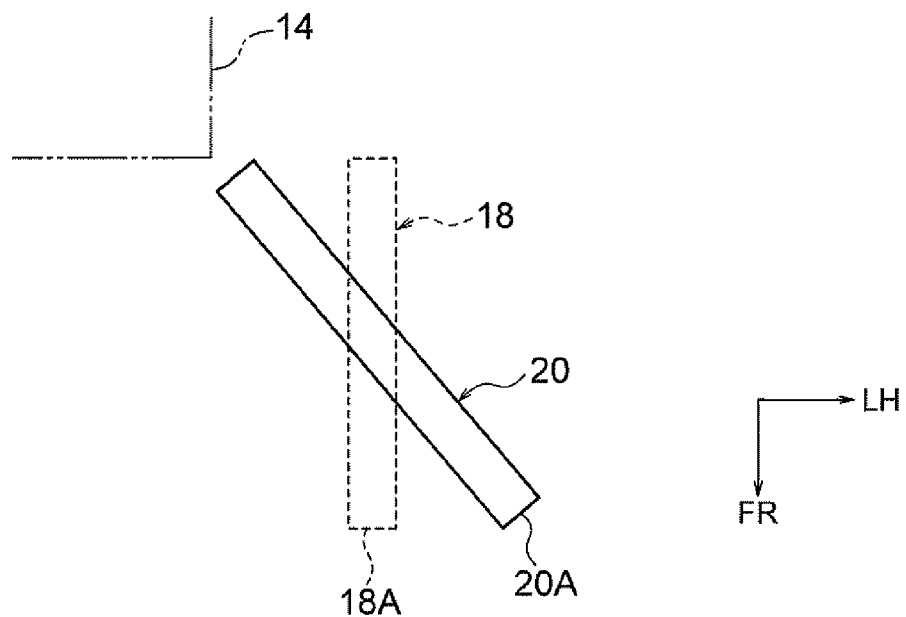
FIG. 5 is a main portion enlarged plan view showing a second modification of the bumper module shown in FIG. 1.

For example, the air guide rib 20 shown in FIG. 5 is inclined with respect to the vehicle front-and-rear direction, in such a way that it heads toward the vehicle outer side as it heads toward the vehicle front side, and intersects any of the longitudinal ribs 18 as seen in a plan view. Further, although it is not particularly illustrated, the front end 20A of the air guide rib 20 is unaligned in the vehicle width direction with respect to all of the front ends of the longitudinal ribs.

Figure 6:
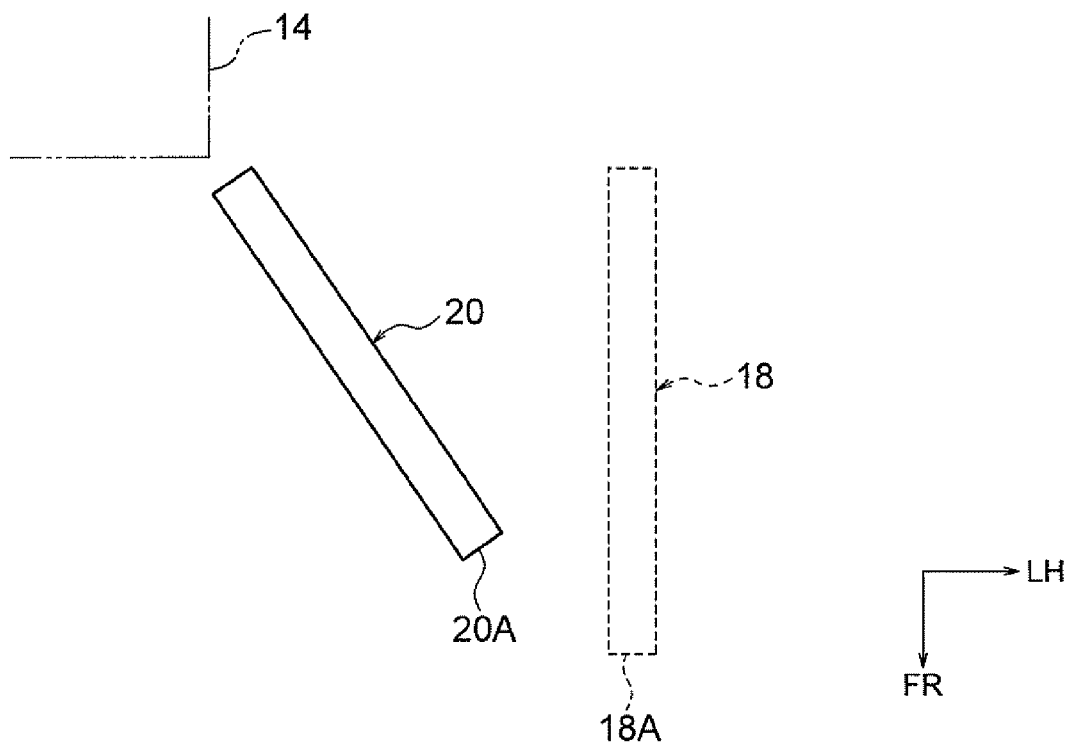
FIG. 6 is a main portion enlarged plan view showing a third modification of the bumper module shown in FIG. 1.

In the modification shown in FIG. 5, the air guide rib 20 may or may not intersect several of the other unillustrated longitudinal ribs as seen in a plan view. Further, as shown in FIG. 6, the air guide rib 20 may not intersect any of the longitudinal ribs 18 as seen in a plan view. Further, as shown in FIG. 6, the front end 20A of the air guide rib 20 may be positioned on the vehicle rear side of the front ends 18A of the longitudinal ribs 18.

According to the modifications shown in FIG. 5 and FIG. 6, in addition to the same effects as in the embodiment of the present invention, because the air guide rib 20 is inclined, there can be obtained the effects that aerodynamic performance can be improved and the cooling air can be smoothly guided to the heat exchanger 14.

Further, the air guide rib 20 shown in FIG. 7 has an inclined portion 20B that heads outward in the vehicle width direction as it heads toward the vehicle front side and a front portion 20C that is formed on the vehicle front side of the inclined portion 20B. Although it is not particularly illustrated, the inclined portion 20B intersects several of the longitudinal ribs as seen in a plan view. The front portion 20C is unaligned in the vehicle width direction with respect to all of the longitudinal ribs. In this modification, the front portion 20C is disposed extending in the vehicle front-and-rear direction, but it may be inclined like the inclined portion 20B. Further, the front end 20A of the air guide rib 20 may be positioned on the vehicle rear side of the front ends 18A of the longitudinal ribs 18.

According to the modification shown in FIG. 7, in addition to the same effects as in the embodiment of the present invention, the following effects can be obtained. That is, according to this modification, even in a case where the angle of inclination and the length of the inclined portion 20B have been set in such a way that the air guide rib 20 can smoothly guide the cooling air from the vehicle front to the heat exchanger 14, simply by changing the extension direction and the length of the front portion 20C, the front end 20A of the air guide rib 20 can be shifted in at least one direction of the vehicle width direction and the vehicle front-and-rear direction with respect to the front ends 18A of each of the longitudinal ribs 18.

In the modification shown in FIG. 7, the front portion 20C of the air guide rib 20 may, as shown in FIG. 8, be disposed extending in the vehicle front-and-rear direction and be positioned in a center portion between any pair of longitudinal ribs 18 adjacent to each other in the vehicle width direction as seen in a plan view.

According to this modification, rigidity can be equalized between the one side and the other side of the pair of the longitudinal ribs 18 positioned on both sides of the front portion 20C in the vehicle width direction, and therefore the reaction force on the impactor can be equalized.

Figure 9:
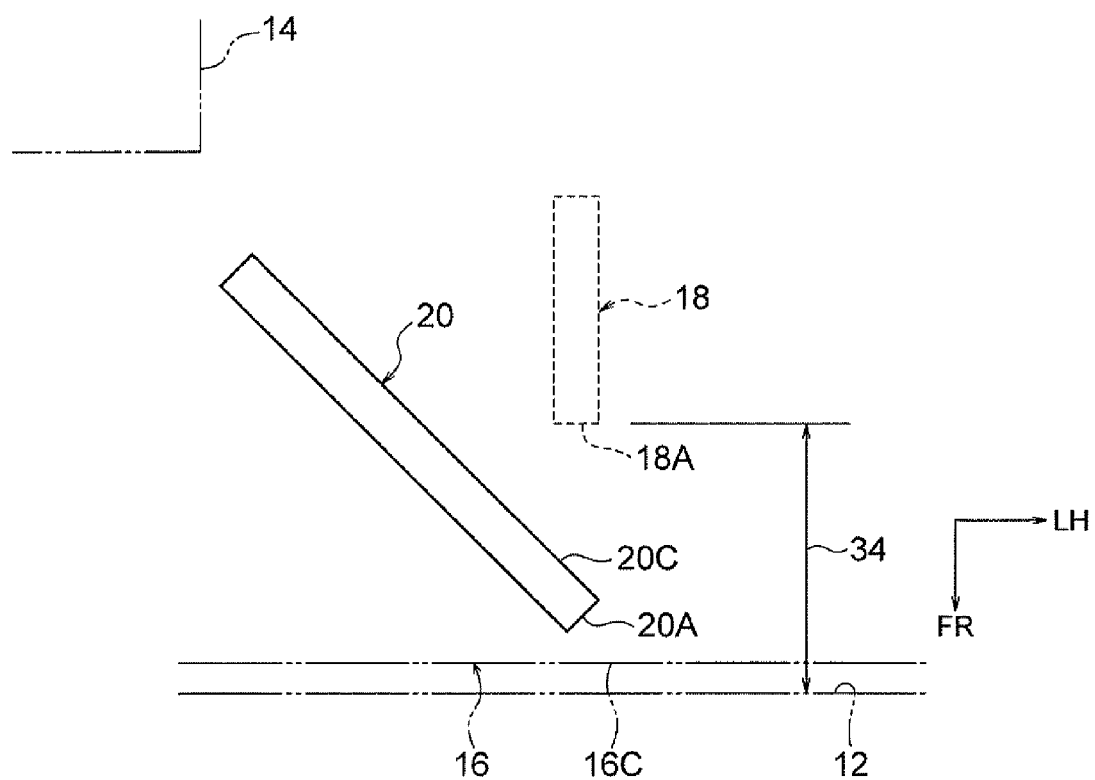
FIG. 9 is a main portion enlarged plan view showing a sixth modification of the bumper module shown in FIG. 1.
Figure 10:
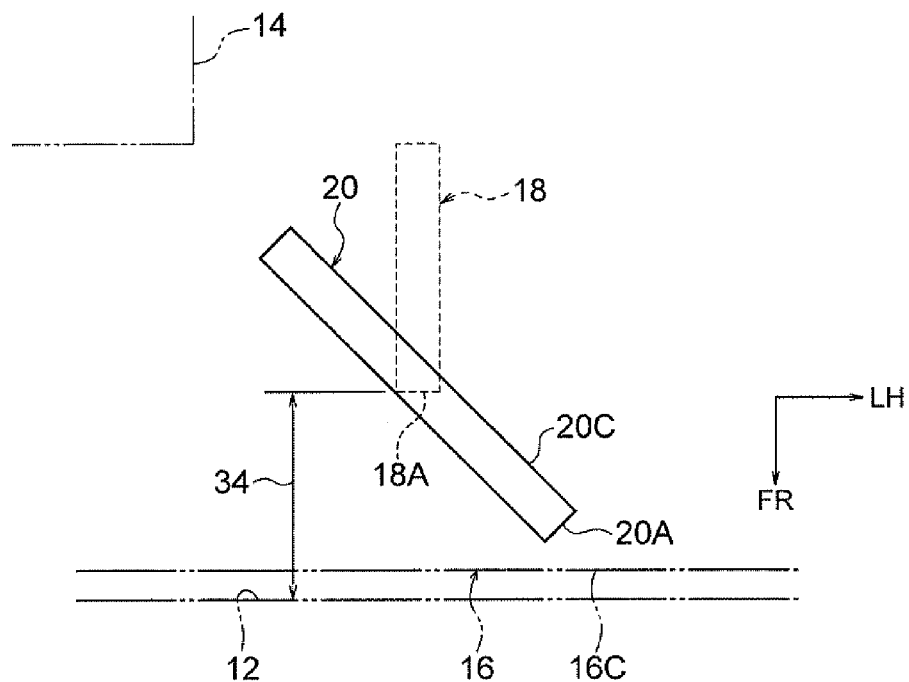
FIG. 10 is a main portion enlarged plan view showing a seventh modification of the bumper module shown in FIG. 1.
Figure 11:
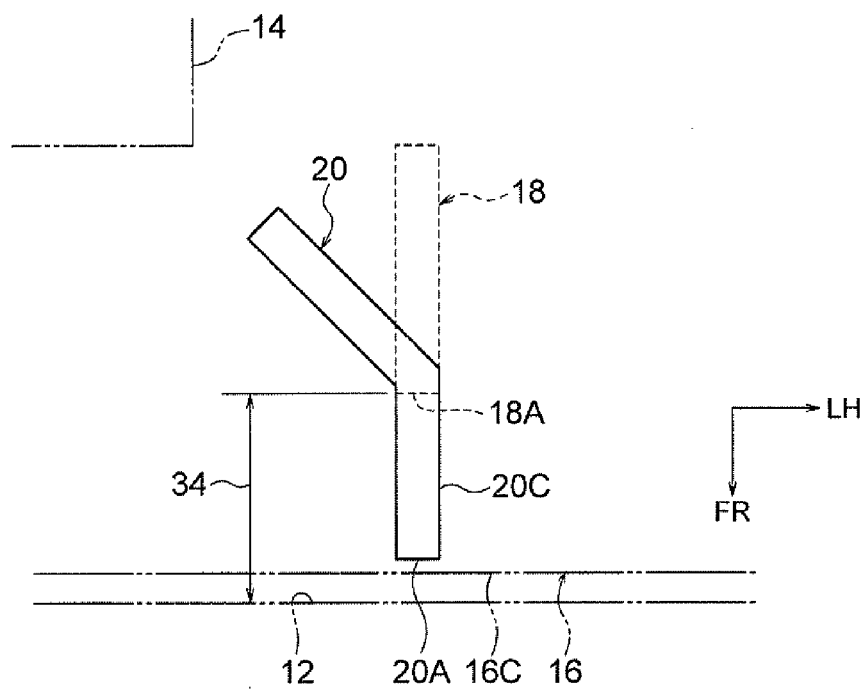
FIG. 11 is a main portion enlarged plan view showing an eighth modification of the bumper module shown in FIG. 1.

Further, in the modifications shown in FIG. 9 to FIG. 11, the end portions 18A of each of the longitudinal ribs 18 are positioned on the vehicle rear side of the front end 16C of the body portion 16. The front portion 20C of the air guide rib 20 is positioned on the vehicle front side of the end portions 18A of each of the longitudinal ribs 18 as seen in a plan view and extends toward the front end 16C of the body portion 16.

As shown in FIG. 9 and FIG. 10, the front portion 20C may, like the inclined portion 20B, be inclined with respect to the vehicle front-and-rear direction in such a way that it heads outward in the vehicle width direction as it heads toward the vehicle front side. Further, as shown in FIG. 11, the front portion 20C may be disposed extending in the vehicle front-and-rear direction. Further, the front end 20A of the air guide rib 20 may coincide with the front end 16C of the body portion 16.

Further, as shown in FIG. 9, the air guide rib 20 may not intersect the longitudinal ribs 18 as seen in a plan view; as shown in FIG. 10 and FIG. 11, the air guide rib 20 may intersect the longitudinal ribs 18 as seen in a plan view. Further, as shown in FIG. 10 and FIG. 11, the front ends 18A of the longitudinal ribs 18 may be positioned in positions overlapping the air guide rib 20 as seen in a plan view.

According to these modifications, in addition to the same effects as those in the embodiment of the present invention, the following effects can be obtained. That is, the front ends 18A of each of the longitudinal ribs 18 are positioned on the vehicle rear side of the front end 16C of the body portion 16. Consequently, a buffer area 34 is ensured between each of the longitudinal ribs 18 and the front bumper cover 12, so the impact absorption of the bumper module 10 can be raised.

Further, the air guide rib 20 has the front portion 20C that is positioned on the vehicle front side of the front ends 18 of each of the longitudinal ribs 18 as seen in a plan view and extends toward the front end 16C of the body portion 16. When configured in this way, the gap between the front end 20A of the air guide rib 20 and the front bumper cover 12 can be narrowed, so the cooling air flowing from the vehicle front through the lower side open portion 24 and the upper side open portion 26 (see FIG. 1) can be suppressed from leaking from between the air guide rib 20 and the front bumper cover 12. Because of this, aerodynamic performance can be improved and the cooling air can be smoothly guided to the heat exchanger 14.

Figure 12:
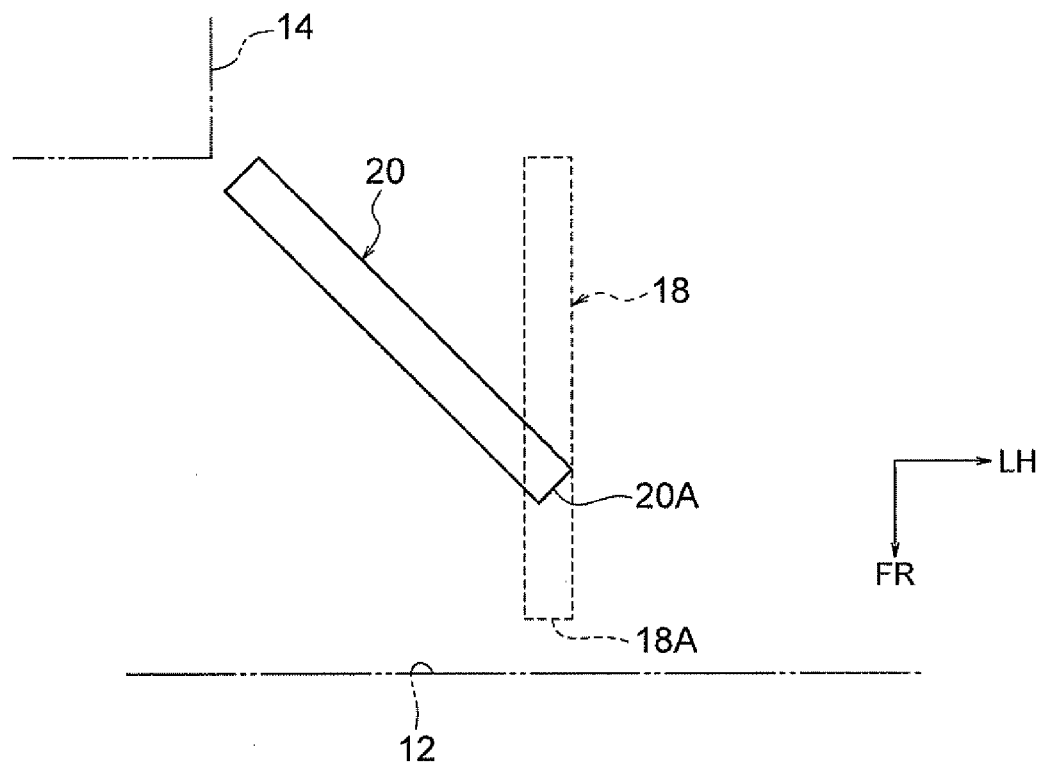
FIG. 12 is a main portion enlarged plan view showing a ninth modification of the bumper module shown in FIG. 1.
Figure 13:
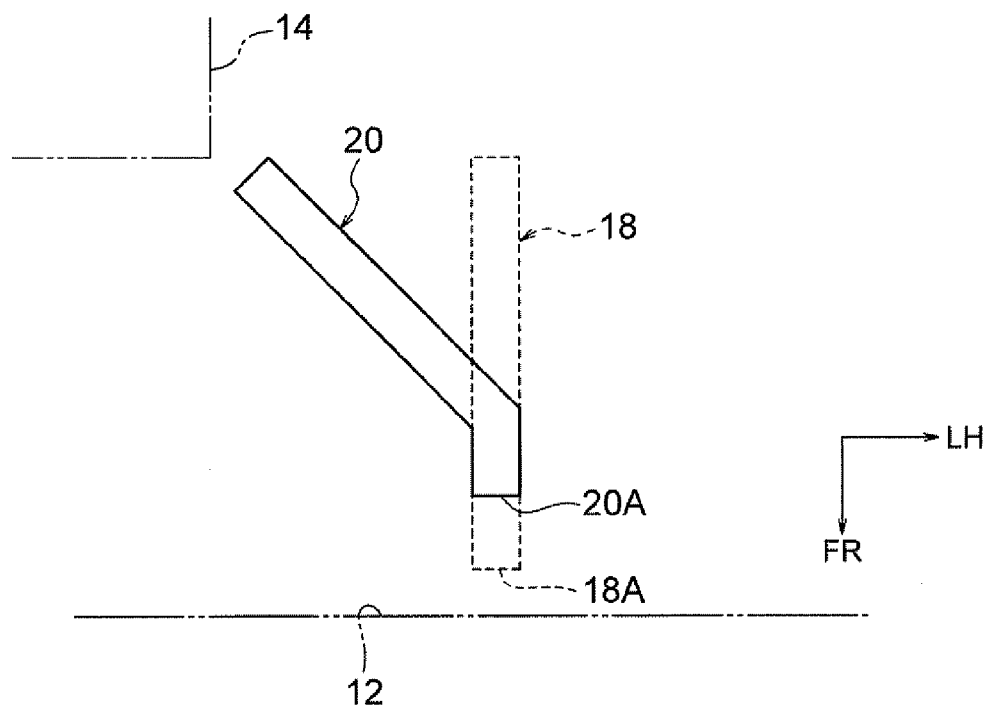
FIG. 13 is a main portion enlarged plan view showing a tenth modification of the bumper module shown in FIG. 1.

Further, for example, as long as leakage of the cooling air from between the air guide rib 20 and the front bumper cover 12 is within an allowed range, the front end 20A of the air guide rib 20 may be placed on the vehicle rear side with respect to the front ends 18A of each of the longitudinal ribs 18 like in the modifications shown in FIG. 12 and FIG. 13.

In the modifications shown in FIG. 12 and FIG. 13, the front ends 18A of each of the longitudinal ribs 18 are near the front bumper cover 12. The position of the front end 20A of the air guide rib 20 in the vehicle width direction coincides with the front end 18A of any of the longitudinal ribs 18.

According to the modifications shown in FIG. 12 and FIG. 13 also, the same effects as those in the embodiment of the present invention can be obtained.

It is possible for combinable modifications of the above-described modifications to be appropriately combined and implemented.

An embodiment of the present invention has been described above, but the present invention is not limited to the above and may, in addition to the above, of course be modified and implemented in various ways without departing from the gist of the invention.

The invention claimed is:

1. A bumper module comprising:
   a body portion that is positioned between a front bumper cover and a heat exchanger in a vehicle front-and-rear direction and is disposed extending in a vehicle width direction and the vehicle front-and-rear direction;
   plural longitudinal ribs that are integrally formed on a lower surface of the body portion, extend toward a vehicle lower side, are disposed extending in the vehicle front-and-rear direction, and are lined up at intervals apart from each other in the vehicle width direction; and
   at least one air guide rib that is integrally formed on an upper surface of the body portion, extends toward a vehicle upper side, guides cooling air from a vehicle front to the heat exchanger, and whose front end is unaligned in at least one direction of the vehicle width direction and the vehicle front-and-rear direction with respect to front ends of the plural longitudinal ribs,
   wherein the at least one air guide rib comprises:
   an inclined portion that heads outward in the vehicle width direction as it heads toward the vehicle front side, and
   a front portion that is formed on the vehicle front side of the inclined portion,
   wherein the front portion is disposed extending in the vehicle front-and-rear direction and is positioned in a center portion between any pair of longitudinal ribs of the plural longitudinal ribs adjacent to each other in the vehicle width direction as seen in a plan view.

2. The bumper module according to claim 1, further comprising a plurality of air guide ribs,
   wherein vehicle front-direction ends of the plural longitudinal ribs are lined up at equal pitches in the vehicle width direction, and vehicle front-direction ends of the plurality of air guide ribs are lined up at equal pitches in the vehicle width direction.

3. The bumper module according to claim 1, wherein the front ends of the plural longitudinal ribs are positioned on a vehicle rear side of a front end of the body portion.

4. A bumper module comprising:
   a body portion that is positioned between a front bumper cover and a heat exchanger in a vehicle front-and-rear direction and is disposed extending in a vehicle width direction and the vehicle front-and-rear direction;
   plural longitudinal ribs that are integrally formed on a lower surface of the body portion, extend toward a vehicle lower side, are disposed extending in the vehicle front-and-rear direction, and are lined up at intervals apart from each other in the vehicle width direction; and
   at least one air guide rib that is integrally formed on an upper surface of the body portion, extends toward a vehicle upper side, guides cooling air from a vehicle front to the heat exchanger, and whose front end is unaligned in at least one direction of the vehicle width direction and the vehicle front-and-rear direction with respect to front ends of the plural longitudinal ribs,
   wherein the at least one air guide rib comprises:
   an inclined portion that heads outward in the vehicle width direction as it heads toward the vehicle front side, and
   a front portion that is formed on the vehicle front side of the inclined portion,
   wherein the front ends of the plural longitudinal ribs are positioned on a vehicle rear side of a front end of the body portion, and
   wherein the front portion of the at least one air guide rib is positioned on the vehicle front side of the front ends of the plural longitudinal ribs as seen in a plan view and extends toward the front end of the body portion.

* * * * *